Patented Dec. 12, 1922.

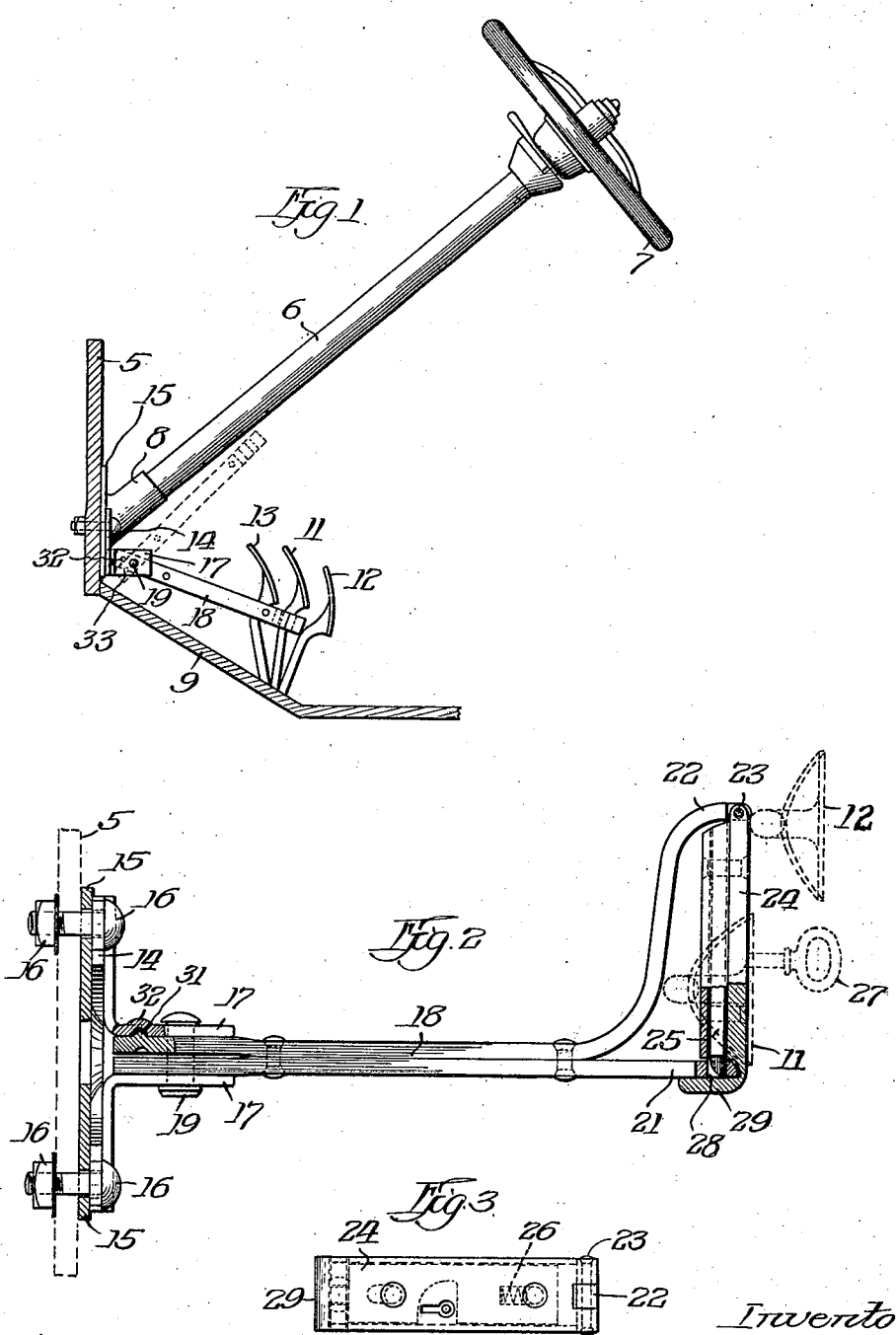

1,438,169

UNITED STATES PATENT OFFICE.

FRANK M. CHRISTENSEN, OF CHICAGO, ILLINOIS.

AUTO LOCK.

Application filed August 13, 1921. Serial No. 491,891.

*To all whom it may concern:*

Be it known that I, FRANK M. CHRISTENSEN, a citizen of the United States, residing at Chicago, in the county of Cook, State of Illinois, have invented certain new and useful Improvements in Auto Locks, of which the following is a specification.

This invention relates in general to automobile locks adapted to prevent the theft or unauthorized use of automobiles, and while my invention may be applied to cars of various makes, it is particularly adaptable, in the form disclosed in the accompaying drawings as illustrative of the invention, to Ford cars.

In Ford cars as is well known, the various gear changes are effected through the manipulation of two foot pedals, one of which controls the forward speed and the other being used for reverse. My invention is designed to lock both of these pedals against operative movement so none of the driving gears can be thrown into operation, thus precluding driving the car away.

Another object of my invention is to provide a locking device which will be simple in construction, economical to manufacture, one which can be quickly applied to a car, one which will be out of the way when disposed in inoperative position, and which will effectively lock the pedals against manipulation when disposed in operative position.

Other objects and advantages of my invention should be readily perceived as the same becomes better understood by reference to the following description, when considered in connection with the accompanying drawings.

Referring to the drawings—

Fig. 1 is a fragmentary view of a car equipped with my invention;

Fig. 2 is an enlarged plan view, partially in section, of my improved locking device; and Fig. 3 is a face view of the lock carrying bar.

Referring now to the drawings more in detail, reference character 5 indicates the dash board of the automobile through which the steering post 6 equipped with the steering wheel 7 extends, the post being mounted in a bearing 8 attached to the dash board. The floor board 9 is provided with the usual slots through which the foot pedals project upwardly into operative position.

The Ford car herein illustrated comprises three pedals, namely, the forward speed pedal 11, disposed at the left hand side viewed by the driver, the reverse pedal 12 located at the center, and the brake pedal 13 located at the right. All of these parts are of usual construction in Ford cars.

My invention which is adapted to lock the pedals 11 and 12 against operative movement comprises a supporting member 14 adapted to fit against the face of the base plate 15 formed integrally with the steering wheel bearing 8 and to be held in position by the bolts 16 passing through the member 14, the plate 15 and the dash 5. The bolts are secured by nuts 16 and the ends protruding beyond the nuts are riveted down so as to prevent unauthorized removal of the nuts. The member 14 is shaped to provide a pair of outwardly projecting ears 17 spaced apart as shown in Fig. 2 adapted to accommodate between them the inner end of an arm 18 which is fulcrumed between the ears upon a pin or rivet 19. The arm 18 is bifurcated at its free end and for convenience in manufacture is preferably made in two pieces, shaped to provide the straight fork 21 and the curved 22. Upon the outer end of the curved fork there is mounted upon a pivot pin 23 a locking bar 24 which is equipped with a key-controlled lock of any preferred construction. For purposes of illustration I have shown an ordinary lock comprising a bolt 25 adapted to be projected into locking position, as shown in Fig. 2 by an expansion spring 26 (Fig. 3) and is adapted to be moved into unlocked position by a key 27. It should be understood that this lock is merely shown for illustrative purposes, and any preferred type of lock such as a Yale lock or other form may be employed.

The fork 21 is provided near its outer end with a recess 28 adapted to receive the projecting end of the bolt 25, and to preclude access to this bolt, the free end of the bar 25 is turned inwardly as indicated at 29 to cover the end of the bolt.

The device when not in use is disposed out of the way adjacent the steering post 6 in the dotted line position shown in Fig. 1 and is preferably equipped with means for automatically holding it in this position. While a variety of means for accomplishing this purpose might be employed, I have shown a simple form in the present instance, wherein, as will be observed from Fig. 1, the inner end of the pieces comprising the arm 18 are spaced apart a limited distance, and one of them is equipped with a protuberance 31 on its outer face formed by punching the metal of the arm member outwardly, which protuberance is adapted to engage in either of two notches 32 and 33 to yieldingly retain the arm in either the inoperative position shown in dotted lines in Fig. 1, or in the operative position shown in full lines.

My invention is applied to the car by removing the fastening bolts 16, placing the supporting member 14 in position, reinserting the bolts and riveting over their ends. The device is then ready for use and when not in service is lifted into the dotted line position shown in Fig. 1. When the car is stopped, the pedals assume the position shown in Fig. 1. The key 27 is then inserted in the lock, the bolt 25 withdrawn from the recess 28 and the locking bar 24 swung outwardly on its pivot pin 23. The device is then lowered over the pedal 11 so that the pedal shank is disposed in the bifurcation between the forks 21 and 22. The bar 24 is then swung into the position shown in Fig. 2, wherein the locking bolt automatically snaps into the recess 28 and locks the bar in position with the pedal 11 securely embraced so that it cannot be moved in either direction. The lateral extension of the fork 22 brings the locking bar 24 in front of the shank of pedal 12 so that this pedal is also held by the device against forward or operative movement. Since the pedal 12 must be moved forwardly in order to become operative, and the pedal 11 must be moved either forwardly or backwardly to actuate the gears it will be obvious that with my improved device in the locked position shown in Figs. 1 and 2, neither of the pedals 11 or 12 can be manipulated, consequently the car cannot be driven away.

To release the lock it is only necessary to insert the key, withdraw the locking bolt from its recess, swing the locking bar outwardly on its pivot and then raise the device into the inoperative position shown in dotted lines in Fig. 1 where it is automatically retained by engagement of the protuberance 31 in its recess 33.

It is believed that my invention, its construction, its manner of attachment to a car, and many of its inherent advantages will be understood from the foregoing without further description, and while I have shown and described a preferred embodiment of the invention, obviously its details of construction are capable of considerable modification within the scope of the invention as defined in the appended claims.

I claim:

1. The combination with an automobile, comprising a steering post and a plurality of foot pedals, of a supporting member mounted adjacent said steering post, an arm pivoted on said supporting member and provided at its free end with a longitudinal extension and with a lateral extension terminating at its end in substantial parallelism with said longitudinal extension, a locking member pivoted on the end of said lateral extension, and a lock carried thereby adapted to lockingly engage with said longitudinal extension, the space between said locking member and said lateral extension being adapted to receive one of said pedals, and the locking member when in locked position being adapted to be disposed in front of another pedal whereby an operative movement of both pedals is precluded.

2. A pedal locking device for automobiles, comprising a supporting member adapted to be secured to a stationary part of the automobile and comprising a pair of parallel ears arranged in spaced relation, a shank having one end disposed between and pivotally connected to said ears, said pivoted end of the shank being constructed to frictionally engage with said ears to hold the shank in adjusted position, said shank being formed of a pair of members, one of which at its outer end is bent laterally away from the other and having its end disposed parallel with said other so as to provide a space between said ends, a locking member pivoted on one of said members, and a lock carried by said locking member adapted to lockingly engage with said other member, said locking member being adapted to embrace and, in conjunction with said laterally bent member, to hold one pedal against movement in either direction, and said locking member being also disposed in front of another pedal to hold said pedal against operative movement.

FRANK M. CHRISTENSEN.